United States Patent [19]

D'Angelo et al.

[11] Patent Number: 4,688,419

[45] Date of Patent: Aug. 25, 1987

[54] FLYWHEEL ASSEMBLY FOR DYNAMOMETERS

[75] Inventors: Severino D'Angelo, Laguna Beach; Robert G. Kinne, San Bernadino, both of Calif.

[73] Assignee: Horiba Instruments Incorporated, Irvine, Calif.

[21] Appl. No.: 943,679

[22] Filed: Dec. 18, 1986

Related U.S. Application Data

[63] Continuation of Ser. No. 831,989, Feb. 21, 1986, abandoned.

[51] Int. Cl.⁴ .................... G01L 3/16; G01M 15/00
[52] U.S. Cl. ................................ 73/117; 73/862.09; 74/572
[58] Field of Search ........ 73/117, 125, 862.09–862.18; 74/572; 310/74

[56] References Cited

U.S. PATENT DOCUMENTS

| | | | |
|---|---|---|---|
| 2,749,747 | 6/1956 | Cline | 73/117 |
| 3,146,619 | 9/1964 | Sinclair et al. | 73/117 X |
| 3,837,219 | 9/1974 | Clayton | 73/117 |

Primary Examiner—Charles A. Ruehl
Attorney, Agent, or Firm—Harness, Dickey & Pierce

[57] ABSTRACT

An improved mechanical flywheel assembly for a chassis dynamometer. The flywheel assembly includes a plurality of flywheels journalled to a stationary shaft located within a cylindrically-shaped drum that is directly coupled to the rollers of the dynamometer so that the drum rotates at the speed of the rollers. Each of the flywheels has an air-actuated clutch mechanism secured around the periphery of the flywheel so that upon actuation, the clutch mechanism expands radially sufficiently to engage the inner wall of the drum and thereby cause the associated flywheel to rotate with the drum. Means are disclosed for controlling the selective actuation of the various clutch mechanisms to thereby selectively control which of the various flywheels are engaged.

20 Claims, 3 Drawing Figures

FLYWHEEL ASSEMBLY FOR DYNAMOMETERS

This is a continuation of U.S. patent application Ser. No. 831,989, filed Feb. 21, 1986, now abandoned.

BACKGROUND AND SUMMARY OF THE INVENTION

The present invention relates to dynamometers for testing vehicles in place and in particular to an improved flywheel assembly for such dynamometers.

Vehicle or chassis dynamometers are used primarily for two purposes: as measuring devices for determining the torque and/or horsepower output of a vehicle, and as simulation devices for simulating the inertia and road load forces to which a vehicle is subjected during actual operation of the vehicle. The present invention is concerned principally with the latter application.

Chassis dynamometer systems, when used as simulators, typically comprise a pair of rollers adapted to be driven by the driving wheels of a vehicle, a flywheel assembly mechanically coupled to the rollers, and a power absorption unit (PAU) such as a DC motor, an eddy current brake, or a hydrokinetic brake, also coupled to the rollers. The flywheel assembly serves to simulate either all or part of the inertia of the vehicle, which is a function of the vehicle's weight and is the force which must be overcome for the vehicle to accelerate or decelerate. The power absorption unit serves to simulate the road load forces, which correspond to those forces which must be overcome to maintain vehicle speed and include such factors as breakaway torque, rolling friction, and windage. In addition, when a DC motor is used as the power absorption unit, the PAU may also electrically simulate part of the inertia of the vehicle. In chassis dynamometers utilizing the latter approach, the flywheel assembly typically comprises a single mechanical flywheel which may, for example, weigh 3,000 pounds, and the PAU is then relied upon to electrically simulate, either plus or minus, the differential between the total mechanical inertia of the dynamometer system, including the flywheel, rollers, and the mechanical inertia associated with the DC motor, and the weight of the vehicle to be tested. An example of such a dynamometer is illustrated and described in U.S. Pat. No. 4,327,578, assigned to the assignee of the present invention.

Alternatively, the inertia of the vehicle may be simulated entirely by mechanical means. This is most commonly accomplished utilizing a plurality of declutchable flywheels of varying weights. Although viewed by some, including the Environmental Protection Agency, as the preferred approach, conventional dynamometers that rely completely upon mechanical flywheel assemblies for simulating vehicle inertia possess several disadvantages. For example, in order to simulate a number of different inertia values, it is necessary to provide a variety of differently weighted flywheels and a corresponding number of clutch mechanisms to selectively engage the flywheels. In a typical system, the flywheels are journalled to a shaft driven by the rollers and the clutches are connected to the flywheels and mounted to the shaft adjacent to each of the flywheels so that selective actuation of the clutches serves to selectively couple the flywheels to the shaft for rotation therewith. The multiplicity of clutches and flywheels, all mounted to the same shaft, however, can result in a flywheel assembly of substantial size and cost. In addition, because the surface area at the point of engagement between the clutch mechanisms and the drive shaft is relatively small, the torque loads applied to the clutches are substantial. Accordingly, expensive, high-load rated clutch mechanisms are required to prevent slippage. In fact, with many of the present commercial dynamometer systems, it is possible to "rock" an engaged flywheel back and forth while at rest, thus indicating the presence of "play" in the coupling between the flywheel and the shaft. Such a condition can, of course, affect the accuracy of the dynamometer.

It is the primary object of the present invention to provide an improved mechanical flywheel assembly for chassis dynamometers that obviates many of the disadvantages associated with conventional mechanical flywheel assemblies. In particular, the flywheel assembly according to the present invention comprises a plurality of flywheels of differing weights that are journalled to a stationary shaft. The flywheels are located within a cylindrically-shaped drum that is directly coupled to the drive shaft from the rollers so that the drum rotates at the speed of the rollers. Fixedly attached to the outer circumference of each of the flywheels is an inflatable clutch mechanism which, when pressurized, engages the inner wall of the drum so that its associated flywheel is forced to rotate with the drum. Because the inflatable clutch mechanism of the present invention engages the drum around the entire outer periphery of the flywheel, the mechanical coupling between the flywheel and the drum is extremely strong. In addition, due to the mechanical advantage realized by the placement of the clutch around the circumference of the flywheel instead of at the drive shaft, the torque loading on the clutch assembly is significantly reduced as well. Moreover, because the conventional shaft-mounted clutch mechanisms are eliminated, the multiple flywheels can be positioned relatively close together on the stationary shaft, thereby significantly reducing the overall length of the flywheel assembly.

Additional objects and advantages of the present invention will become apparent from a reading of the following Detailed Description of the Preferred Embodiment which makes reference to the accompanying drawings in which:

DETAILED DESCRIPTION OF THE PREFERRED EMBODIMENT

Figure 1:
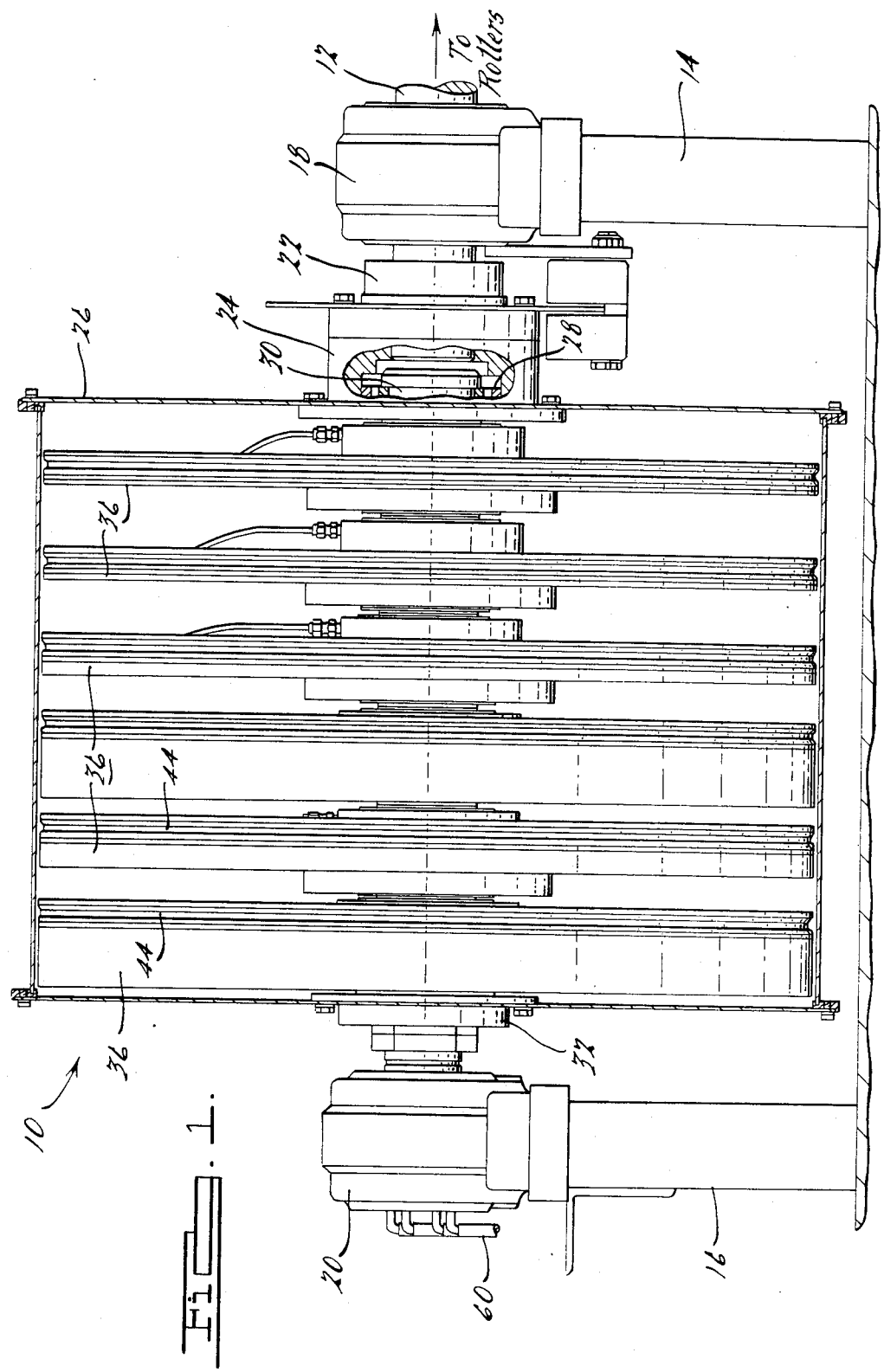
FIG. 1 is a partial cutaway view of a flywheel assembly according to the present invention.

Referring to FIG. 1, a mechanical flywheel assembly 10 according to the present invention is shown. As indicated above, the flywheel assembly 10 in the preferred embodiment comprises a component part of a chassis dynamometer for testing vehicles in place. In particular, the flywheel assembly 10 serves to mechanically simulate the inertia forces of a moving vehicle. The flywheel assembly 10 is adapted to be connected to the rollers (not shown) of the dynamometer via a drive shaft 12 which is directly coupled to and driven by the rollers. The flywheel assembly 10 is supported at one end by a roller bearing 18 mounted to support 14 and at the other end by a pillow block 20 mounted to support 16. The roller drive shaft 12 is journalled to roller bearing 18 and keyed directly to a collar member 22 which is bolted to a bearing support 24. Bearing support 24 is in turn bolted to a cylindrically-shaped drum 26 which is journalled to a stationary shaft 30 via roller bearing 28 in bearing support 24 at one end and by roller bearing 34 (FIG. 2) in bearing support 32 at its opposite end. Stationary shaft 30 is supported at one end by roller bearing 28 in bearing support 24 and at its other end by the pillow block 20. In view of the mechanical couplings described, it will be appreciated that cylindrical drum 26 is adapted to rotate with drive shaft 12 which in turn is driven by the rollers of the dynamometer.

Figure 2:
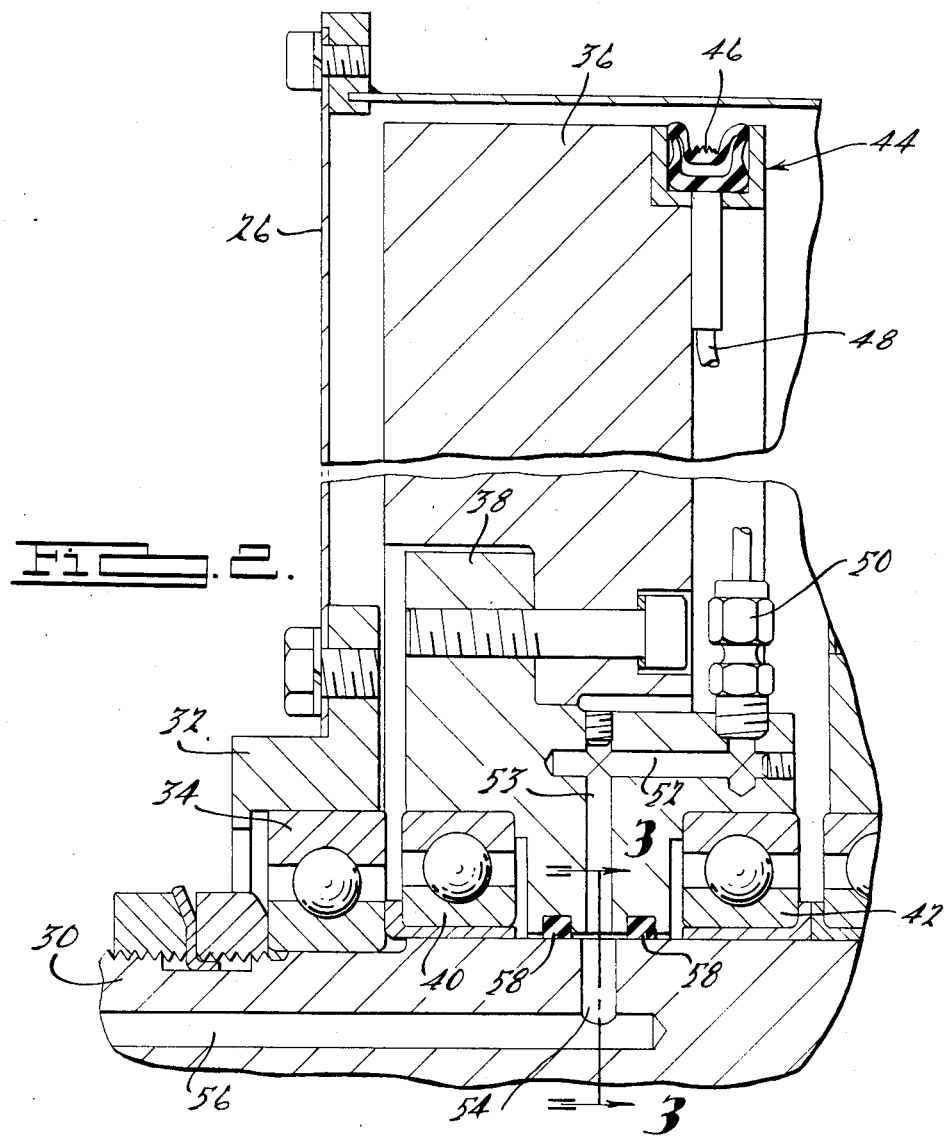
FIG. 2 is a detailed sectional view of one of the flywheels in the assembly illustrated in FIG. 1.

Journalled to stationary shaft 30 and located within cylindrical drum 26 are a plurality of flywheels 36 of varying weights. In the preferred embodiment, the flywheel assembly 10 includes six individual flywheels: two 2,000-pound flywheels, and one flywheel each of 1,000 pounds, 500 pounds, 250 pounds, and 125 pounds. It will be appreciated that this selection of flywheels provides a large variety of total weight combinations, thereby permitting the simulation of a wide range of vehicle inertia values. With particular reference to FIG. 2, each of the flywheels 36 is bolted to a bearing block 38 which is journalled to stationary shaft 30 via a pair of roller bearings 40 and 42. A pair of roller bearings is preferably employed to prevent the flywheel 36 from wobbling as it rotates. As can be seen from the drawings, the outer diameters of the flywheels 36 are slightly smaller than the inside diameter of the cylindrical drum assembly 26. In this manner, the drum 26 can rotate independent of the flywheels 36. Fixedly secured around the entire outer periphery of each of the flywheels 36 is an expandable clutch mechanism 44. The clutch assembly 44 in the preferred embodiment is air actuated and includes an expandable, elastomeric tubular-shaped element 46 which when inflated increases in dimension radially sufficiently to engage the inner surface of cylindrical drum 26. Clutch mechanisms suitable for use in the present invention are commercially available from a variety of manufacturers including the Eaton Corporation under the brand name "Airflex".

Figure 3:
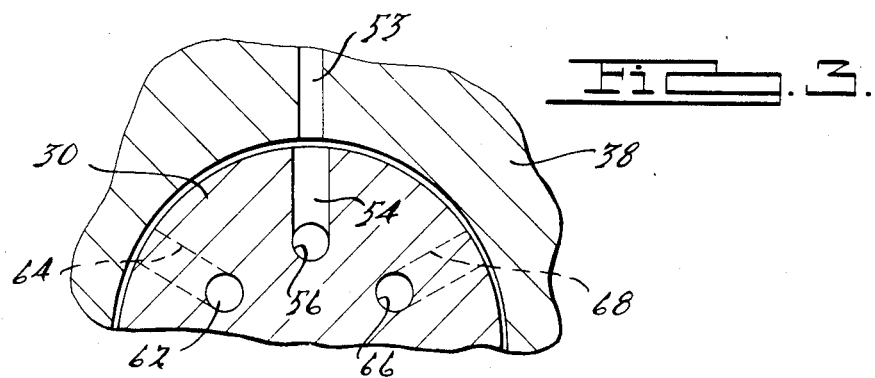
FIG. 3 is a sectional view taken along line 3—3 in FIG. 2.

Air pressure is supplied to the clutch mechanism 44 via a flexible air line 48 which is connected to the bearing block 38 via a coupling 50. Bearing block 38 in turn has formed therein a pair of bores 52 and 53 at right angles to one another which communicate the air line 48 with a radial hole 54 formed in stationary shaft 30. A pair of air seals 58 located in the bearing block 38 on either side of bore 53 and hole 54 provide an air seal between the rotating bearing block 38 and the stationary shaft 30. Radial hole 54 in turn communicates with a longitudinal bore 56 formed in stationary shaft 30. As best shown in FIG. 3, stationary shaft 30 has formed therein six radially spaced longitudinal bores (only three of which are illustrated, 56, 62, and 66) which individually communicate with the outwardly radially projecting holes 54, 64, and 68, respectively. The six radially projecting holes (only three of which are illustrated, 54, 64, and 68) are spaced along the length of stationary shaft 30 so as to selectively communicate with the air holes 53 located in each of the six flywheel bearing blocks 38. The longitudinal bores 56, 62, and 66 are connected via air fittings 60 (FIG. 1) at the exposed end of stationary shaft 30 to a source of compressed air through a corresponding number of solenoid valves (not shown) for selectively controlling the energization of each of the clutch mechanisms 44.

Thus, it will be appreciated that when a clutch mechanism 44 is energized and the flexible member 46 thereof is expanded to contact the inner wall of drum assembly 26, the flywheel 36 associated with the clutch mechanism 44 will be caused to rotate with the drum assembly 26. Accordingly, by selective energization of the clutch mechanisms 44, selected flywheels 36 can be engaged. Additionally, it has been determined that it may be preferred to subject the air lines to a negative pressure to insure complete disengagement of a previously engaged clutch mechanism. Moreover, it will be appreciated that the torque load on the clutch member 44 is substantially reduced relative to an axially located clutch member due to the significantly increased surface area between the circumferentially located clutch member 44 and the wall of the cylindrical drum 26. As a result, the engaged flywheel 36 is extremely tightly coupled to the drum assembly 26 when the clutch member 44 is actuated. Thus, the flywheel assembly according to the present invention eliminates the "slop or play" typically associated with conventional mechanical flywheel assemblies. It will further be appreciated that by removing the clutch assemblies from the shaft to which the flywheels are journalled, the various flywheels can be "stacked" closely together, thereby significantly reducing the overall axial length of the flywheel assembly 10.

While the above description constitutes the preferred embodiment of the invention, it will be appreciated that the invention is susceptible to modification, variation, and change without departing from the proper scope or fair meaning of the accompanying claims.

We claim:

1. A mechanical flywheel assembly for a dynamometer system having an output shaft adapted to be driven by the device being tested, including:
   a cylindrically-shaped drum journalled to a stationary shaft aligned with the axis of the drum and mechanically coupled to said output shaft so that said drum rotates with said output shaft;
   a plurality of flywheels located within said drum and journalled to said stationary shaft, said flywheels having diameters less than the inside diameter of said drum;
   a plurality of radially expandable clutch members secured to said flywheels adjacent to the periphery of said flywheels so that when actuated said clutch members expand radially a sufficient distance to engage the inside surface of said drum; and
   means for controlling the selective actuation of said clutch members.

2. The mechanical flywheel assembly of claim 1 wherein said expandable clutch members are actuated by compressed air.

3. In a dynamometer system for testing vehicles in place including at least one roller adapted for driving engagement with the driving wheels of a vehicle, a power absorption unit coupled to said roller for simulating road load forces to which the vehicle would be subjected during normal operation, and a flywheel assembly coupled to said roller for mechanically simulating the inertia forces of the vehicle, the improvement comprising:
   a cylindrically-shaped drum journalled to a stationary shaft aligned with the axis of the drum and mechanically coupled to said roller so that said drum rotates with said roller;

a plurality of flywheels located within said drum and journalled to said stationary shaft, said flywheels having diameters less than the inside diameter of said drum;

a plurality of radially expandable clutch members secured to said flywheels adjacent to the periphery of said flywheels so that when actuated said clutch members expand radially a sufficient distance to engage the inside surface of said drum; and means for controlling the selective actuation of said clutch members.

4. The dynamometer system of claim 3 wherein said expandable clutch members are actuated by compressed air.

5. A mechanical flywheel assembly for a dynamometer system having an output shaft adapted to be driven by the device being tested, including:

a plurality of flywheels journalled to a stationary shaft;

a structure journalled to said stationary shaft and mechanically coupled to said output shaft so that said structure rotates with said output shaft, said structure being configured so as to rotate closely adjacent the peripheries of said flywheels; and a plurality of controllable engagement means operatively associated with each of said flywheels and positioned at the interface between the peripheries of said flywheels and said structure so that upon actuation of one or more of said engagement means said structure is mechanically coupled to said respective flywheels.

6. The mechanical flywheel assembly of claim 5 further including means for controlling the selective actuation of said engagement means.

7. The mechanical flywheel assembly of claim 5 wherein said engagement means comprise radially expandable clutch members.

8. The mechanical flywheel assembly of claim 7 wherein said clutch members are secured to said flywheels.

9. The mechanical flywheel assembly of claim 8 wherein said structure comprises a cylindrically shaped drum having an inside diameter slightly greater than the outside diameter of said flywheels.

10. The mechanical flywheel assembly of claim 9 wherein said clutch members are adapted to radially expand upon actuation a sufficient distance to mechanically engage the inside surface of said drum to cause said respective flywheels to rotate with said drum.

11. The mechanical flywheel assembly of claim 10 wherein said clutch members are located substantially around the entire periphery of each of said flywheels.

12. The mechanical flywheel assembly of claim 11 wherein said clutch members are actuated by compressed air.

13. In a dynamometer system for testing vehicles in place including at least one roller adapted for driving engagement with the driving wheels of a vehicle, a power absorption unit coupled to said roller for simulating road load forces to which the vehicle would be subjected during normal operation, and a flywheel assembly coupled to said roller for mechanically simulating the inertia forces of the vehicle, the improvement comprising:

a plurality of flywheels journalled to a stationary shaft;

a structure journalled to said stationary shaft and mechanically coupled to said roller so that said structure rotates with said roller, said structure being configured so as to rotate closely adjacent the peripheries of said flywheels; and a plurality of controllable engagement means operatively associated with each of said flywheels and positioned at the interface between the peripheries of said flywheels and said structure so that upon actuation of one or more of said engagement means said structure is mechanically coupled to said respective flywheels.

14. The dynamometer system of claim 13 further including means for controlling the selective actuation of said engagement means.

15. The dynamometer system of claim 13 wherein said engagement means comprise radially expandable clutch members.

16. The dynamometer system of claim 15 wherein said clutch members are secured to said flywheels.

17. The dynamometer system of claim 16 wherein said structure comprises a cylindrically shaped drum having an inside diameter slightly greater than the outside diameter of said flywheels.

18. The dynamometer system of claim 17 wherein said clutch members are adapted to radially expand upon actuation a sufficient distance to mechanically engage the inside surface of said drum to cause said respective flywheels to rotate with said drum.

19. The dynamometer system of claim 18 wherein said clutch members are located substantially around the entire periphery of each of said flywheels.

20. The dynamometer system of claim 19 wherein said clutch members are actuated by compressed air.

* * * * *

UNITED STATES PATENT AND TRADEMARK OFFICE
CERTIFICATE OF CORRECTION

PATENT NO. : 4,688,419

DATED : August 25, 1987

INVENTOR(S) : Severino D'Angelo et al.

It is certified that error appears in the above-identified patent and that said Letters Patent is hereby corrected as shown below:

Column 4, line 46, claim 1, after "a", insert --corresponding--.

Column 5, line 5, claim 3, after "a", insert --corresponding--.

Signed and Sealed this

Fifth Day of April, 1988

*Attest:*

DONALD J. QUIGG

*Attesting Officer*

*Commissioner of Patents and Trademarks*